(12) United States Patent
Racaniere

(10) Patent No.: US 8,116,553 B2
(45) Date of Patent: Feb. 14, 2012

(54) ROTATION INVARIANT 2D SKETCH DESCRIPTOR

(75) Inventor: Sebastien Racaniere, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1162 days.

(21) Appl. No.: 11/869,597

(22) Filed: Oct. 9, 2007

(65) Prior Publication Data

US 2009/0093994 A1    Apr. 9, 2009

Related U.S. Application Data

(60) Provisional application No. 60/977,284, filed on Oct. 3, 2007.

(51) Int. Cl.
*G01B 21/16* (2006.01)
*G06F 17/14* (2006.01)

(52) U.S. Cl. ........ 382/141; 382/100; 382/298; 702/158; 708/403

(58) Field of Classification Search ........... 382/100, 382/141, 298; 702/158; 708/403
See application file for complete search history.

(56) References Cited

U.S. PATENT DOCUMENTS

| 6,628,845 | B1* | 9/2003 | Stone et al. | 382/294 |
| 7,813,900 | B2* | 10/2010 | Takeda et al. | 702/197 |
| 2003/0110163 | A1* | 6/2003 | Chen et al. | 707/3 |
| 2004/0086197 | A1* | 5/2004 | Fletcher et al. | 382/276 |
| 2006/0050985 | A1 | 3/2006 | Fletcher | |
| 2011/0019903 | A1* | 1/2011 | Joly et al. | 382/141 |

FOREIGN PATENT DOCUMENTS

DE        10056287 A1    5/2002

OTHER PUBLICATIONS

Srinivasan V.S., et al. Published in Pattern Recongition, vol. 2—Conference B: Coputer Vision & IM Age Processing, Proceedings of the 12th IAPR International Conference, vol. 2, Oct. 9, 2004 (pp. 567-569); Magazine.

Kadyrov, et al. Published in IEEE Transactions on Pattern Analysis and Machine Intelligence, vol. 23, No. 8, Aug. 1, 2001 (pp. 811-828); Magazine.

* cited by examiner

*Primary Examiner* — Stephen Koziol

(57) ABSTRACT

A system, method, and computer program for determining a descriptor, comprising calculating a maximum distance for a plurality of points in a sector between each of said plurality of points and an origin; calculating a minimal distance from one of said plurality of points and a target line, wherein said maximum distance is an initial value; computing a plurality of Fourier coefficients from said minimal distances; and defining an invariant descriptor from said Fourier coefficients, and appropriate means and computer-readable instructions.

10 Claims, 10 Drawing Sheets

US 8,116,553 B2

ROTATION INVARIANT 2D SKETCH DESCRIPTOR

CROSS-REFERENCE TO RELATED APPLICATIONS

This Application claims priority to pending Provisional U.S. Application Ser. No. 60/977,284, filed on Oct. 3, 2007.

TECHNICAL FIELD

The presently preferred embodiment of the innovations described herein relates generally to computer graphics software applications. More specifically, the presently preferred embodiment relates to a method and system for extracting an invariant descriptor from a two-dimensional sketch.

BACKGROUND

In product development, 30% to 40% of a manufacturer's parts are duplicates or have acceptable substitutes to parts already created, according to a study by the Aberdeen Group. Aberdeen goes on to say that there is an annual carrying cost of between $4,500 and $23,000 per item for the introduction of new parts where there was an acceptable duplicate part available. That said, tools that allow manufacturer's the ability to search for existing parts substantially reduce product development with part reuse. Traditionally, those tools were text-based descriptions of the part geometry, but limits for those tools were soon reached as products began to include more and more complicated parts. Another limitation also occurs in cases when working in a multi-lingual environment when translation among various languages may break-down the accuracy of the text-based part description.

A recent trend in data management of product development moves from searching the above mentioned text-based descriptors to, instead, searching the geometry of the parts themselves. This is a difficult problem that requires highly technical solutions. A difficulty here is that the user may want the geometry of a part to be considered unchanged when that part is translated, rotated, or even sometimes scaled.

One common solution to the above problem consists in extracting a descriptor from the geometries that is itself invariant under translation, rotation or scaling and to then use these descriptors to index the geometries. Invariance means that the same result is returned no matter the orientation of the sketch. Scale invariance implies invariance with respect to scaling by a factor, only. Same with translation and rotation invariance. One reason behind the success of such a solution lies in the fact that it efficiently divides the work in two phases: (1) an off-line phase where the extraction of the descriptor from the geometry is a relatively slow process, but one that needs to be performed only once; and (2) an on-line phase, where the comparison of descriptors is a very fast process that allows quick retrieval of similar geometries. These common solutions compare the silhouettes of two-dimensional ("2D") objects in order to determine their external similarity.

What is needed is a system, process, and method for determining a rotation invariant sketch descriptor that includes not only the external similarities, but also the internal similarities that is often times as important.

SUMMARY

To achieve the foregoing, and in accordance with the purpose of the presently preferred embodiment as broadly described herein, the present application provides a method for determining a descriptor, comprising calculating a maximum distance for a plurality of points in a sector between each of said plurality of points and an origin; calculating a minimal distance from one of said plurality of points and a target line, wherein said maximum distance is an initial value; computing a plurality of Fourier coefficients from said minimal distances; and defining an invariant descriptor from said Fourier coefficients. The method, wherein said target line is a concentric circle.

Another advantage of the presently preferred embodiment described herein is a method for indexing a geometry, comprising translating a sketch such that said sketch has a sketch origin located at a plane origin; scaling said sketch such that an average distance from a point on said sketch to said origin equals a unit; and extracting a invariant rotational descriptor from said sketch; whereby a sketch is indexed by its invariant rotational descriptor. The method, wherein extracting comprises calculating a maximum distance for a plurality of points in a sector between each of said plurality of points and an origin. The method, where in extracting comprises calculating a minimal distance from one of said plurality of points and a target line, wherein said maximum distance is an initial value. The method, wherein extracting comprises computing a plurality of Fourier coefficients from said minimal distances. The method, wherein extracting comprises defining an invariant descriptor from said Fourier coefficients. The method, wherein said target line is a concentric circle.

And another advantage of the presently preferred embodiment described herein is a system for determining a descriptor, comprising a sketch database having a plurality of two-dimensional sketches; a rotational invariant descriptor calculated from each of said plurality of two-dimensional sketches; and a descriptor database having an index of said rotational invariant descriptors.

Yet another advantage of the presently preferred embodiment described herein is a method, comprising accessing a database having a plurality of invariant rotational descriptors; searching for at least one sketch that has a corresponding invariant rotational descriptor; and retrieving said at least one sketch for comparison.

And yet another advantage of the presently preferred embodiment described herein is a computer-program product tangibly embodied in a machine readable medium to perform a method for determining a descriptor, comprising instructions operable to cause a computer to calculate a maximum distance for plurality of points in a sector between each of said plurality of points and an origin; calculate a minimal distance from one of said plurality of points and a target line, wherein said maximum distance is an initial value; compute a plurality of Fourier coefficients from said minimal distances; and define an invariant descriptor from said Fourier coefficients. The computer-program product, wherein said target line is a concentric circle.

Still another advantage of the presently preferred embodiment described herein is a computer-program product tangibly embodied in a machine readable medium to perform a method for indexing a geometry, comprising instructions operable to cause a computer to translate a sketch such that said sketch has a center of gravity located at a plane origin; scale said sketch such that an average distance from a point on said sketch to said origin equals a unit; extract an invariant rotational descriptor from said sketch. The computer-pro gram product, wherein said instructions to extract said descriptor from said sketch, further comprises instructions operable to cause a computer to calculate a maximum distance for plurality of points in a sector between each of said plurality of points and an origin; calculate a minimal distance from one of said plurality of points and a target line, wherein said maximum distance is an initial value; compute a plurality of Fourier coefficients from said minimal distances; and define an invariant descriptor from said Fourier coefficients. The computer-program product, wherein the target line is a concentric circle.

And still yet another advantage of the presently preferred embodiment described herein is data processing system having at least a processor and accessible memory to implement a method for determining a descriptor, comprising means for calculating a maximum distance for plurality of points in a sector between each of said plurality of points and an origin; means for calculating a minimal distance from one of said plurality of points and a target line, wherein said maximum distance is an initial value; means for computing a plurality of Fourier coefficients from said minimal distances; and means for defining an invariant descriptor from said Fourier coefficients.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 10:
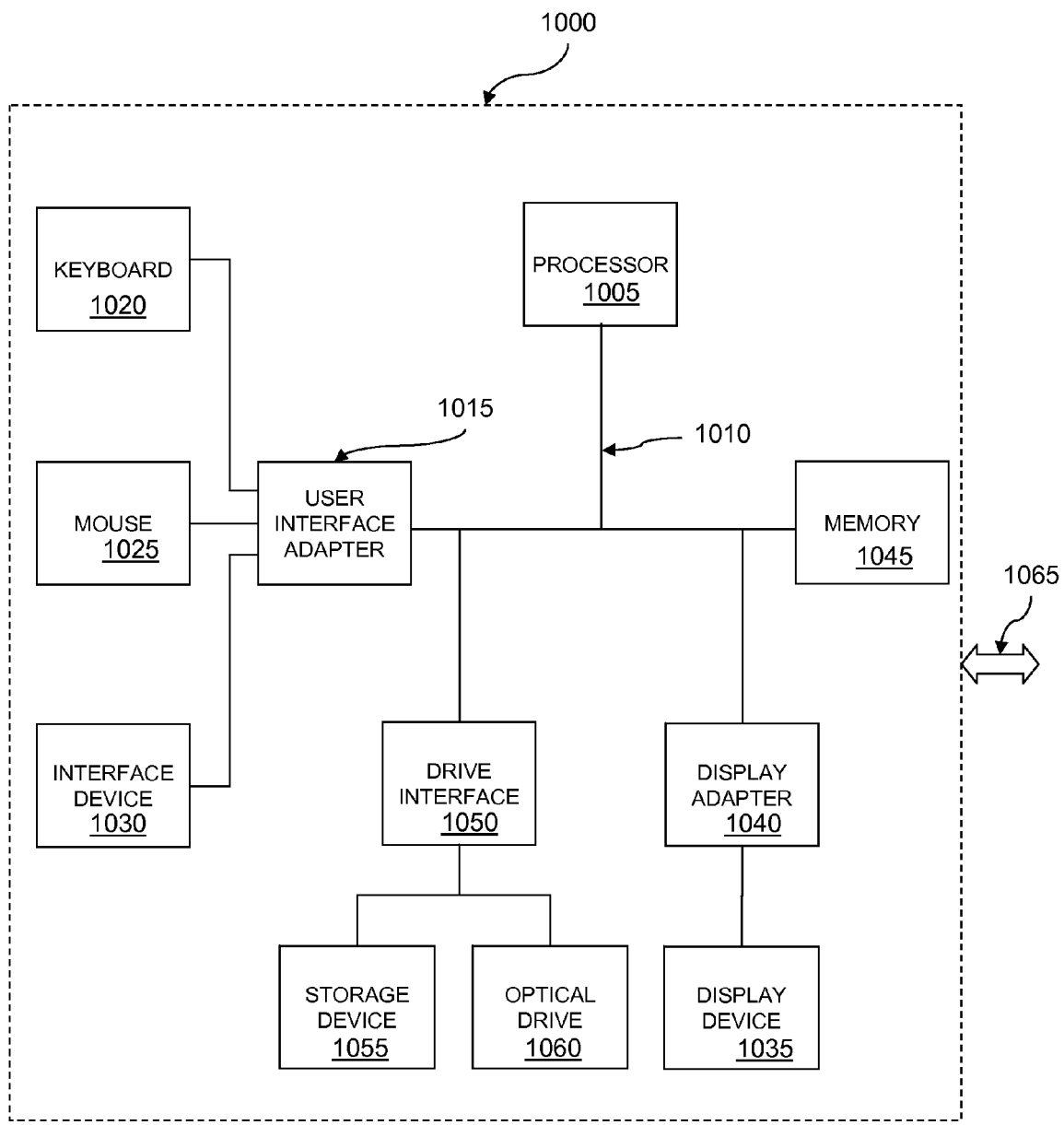
FIG. 10 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for determining a descriptor. Now therefore, in accordance with the presently preferred embodiment, an operating system executes on a computer, such as a general-purpose personal computer. FIG. 10 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 10, an exemplary system for implementing the presently preferred embodiment includes a general-purpose computing device in the form of a computer 1000, such as a desktop or laptop computer, including a plurality of related peripheral devices (not depicted). The computer 1000 includes a microprocessor 1005 and a bus 1010 employed to connect and enable communication between the microprocessor 1005 and a plurality of components of the computer 1000 in accordance with known techniques. The bus 1010 may be any of several types of bus structures including a memory bus or memory controller, a peripheral bus, and a local bus using any of a variety of bus architectures. The computer 1000 typically includes a user interface adapter 1015, which connects the microprocessor 1005 via the bus 1010 to one or more interface devices, such as a keyboard 1020, mouse 1025, and/or other interface devices 1030, which can be any user interface device, such as a touch sensitive screen, digitized pen entry pad, etc. The bus 1010 also connects a display device 1035, such as an LCD screen or monitor, to the microprocessor 1005 via a display adapter 1040. The bus 1010 also connects the microprocessor 1005 to a memory 1045, which can include ROM, RAM, etc.

The computer 1000 further includes a drive interface 1050 that couples at least one storage device 1055 and/or at least one optical drive 1060 to the bus. The storage device 1055 can include a hard disk drive, not shown, for reading and writing to a disk, a magnetic disk drive, not shown, for reading from or writing to a removable magnetic disk drive. Likewise the optical drive 1060 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 1000.

The computer 1000 can communicate via a communications channel 1065 with other computers or networks of computers. The computer 1000 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 1045 of the computer 1000. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
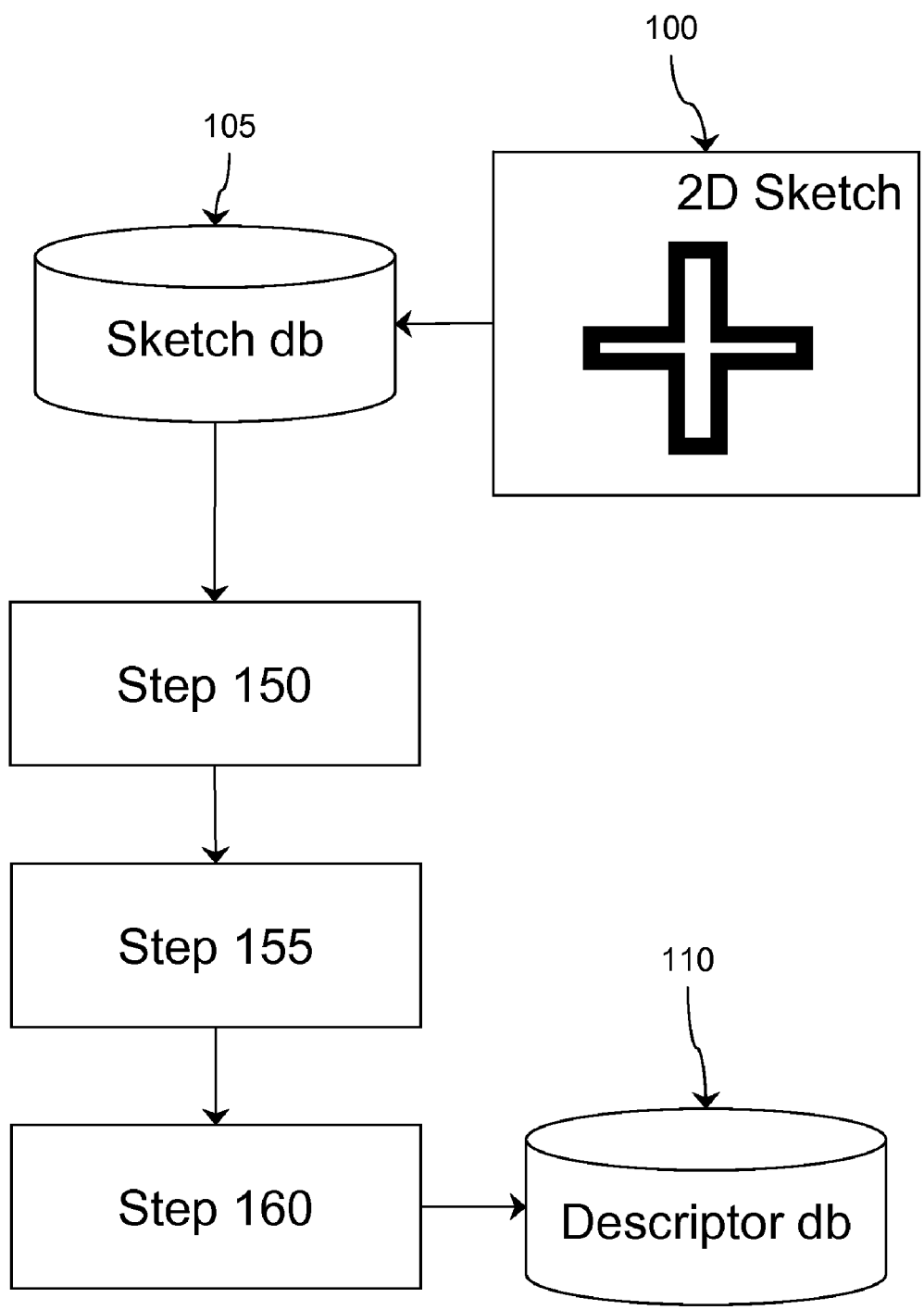
FIG. 1 is a flowchart generally outlining the presently preferred embodiment.

FIG. 1 is a flowchart generally outlining the presently preferred embodiment. A two-dimensional (2D) sketch 100, or geometry or image, is created from an application or program such as SolidEdge by Siemens Product Lifecycle Management Software Inc. Referring to FIG. 1, the 2D sketch 100 is typically stored in a sketch database 105 for use by the graphics program for further modification or viewing, or use by another program altogether. The sketch database 105 can index the 2D sketch 100 based on a user defined description or title assigned to the 2D sketch 100, but a preferable way, disclosed herein, is the indexing of the 2D sketch 100 based upon a descriptor of that 2D sketch 100, specifically a rotationally invariant 2D descriptor. Retrieve the 2D sketch 100 from the sketch database 105 (Step 150). Extract a rotation invariant descriptor D from the 2D sketch 100 (Step 155). Then, store the rotation invariant descriptor D in a descriptor database 110 (Step 160).

Figure 2:
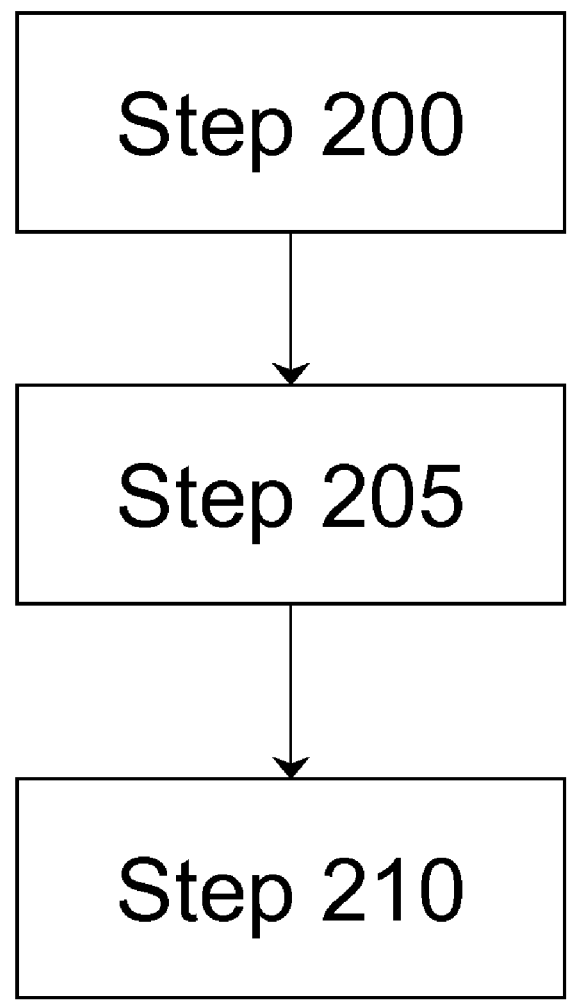
FIG. 2 is a flowchart illustrating an overview of a process to extract a descriptor from a 2D sketch.

Because the 2D sketch 100 can be oriented in any number of ways, for example, rotated in any one of 360 degrees or fractions thereof, it is important to normalize the 2D sketch 100 according to orientations well known in the art, for example, translation invariance, scale invariance, and rotational invariance. FIG. 2 is a flowchart illustrating an overview of a process to extract the descriptor from the 2D sketch 100. Referring to FIG. 2, the 2D sketch 100 is translated such that the center of gravity, also known as a sketch origin, is located at the plane origin (Step 200) thus ensuring translation invariance. Next, the 2D sketch 100 is scaled such that an average distance from a point on the 2D sketch 100 to the sketch origin equals 1 unit, where that unit is a function of the sketch (Step 205) thus ensuring scale invariance. And the rotation invariant 2D descriptor is extracted using the presently preferred embodiment disclosed herein (Step 210).

Figure 3:
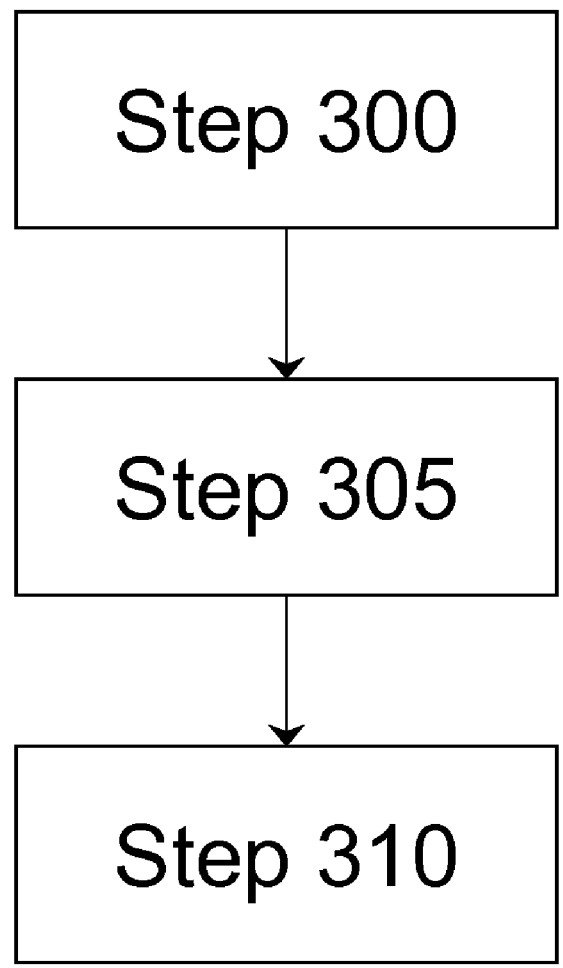
FIG. 3 is a flowchart illustrating an overview of a process to highlight extracting a 2D rotational invariant sketch descriptor.

FIG. 3 is a flowchart illustrating an overview of a process to highlight extracting the 2D rotational invariant sketch descriptor detailed more fully below. Referring to FIG. 3, beginning with the 2D sketch 100, set r (Step 300) a maximum distance between a point on the 2D sketch 100 and the origin. Next, use r to intialize $\phi$ (Step 305), where $\phi$ is an array of minimal distances between points on the 2D sketch 100 that lie within certain sectors of the plane with those portions of certain target lines, i.e., portions of concentric circles, that lie in the same sector. Finally compute the rotational invariant 2D sketch descriptor from $\phi$ (Step 310).

Figure 4:
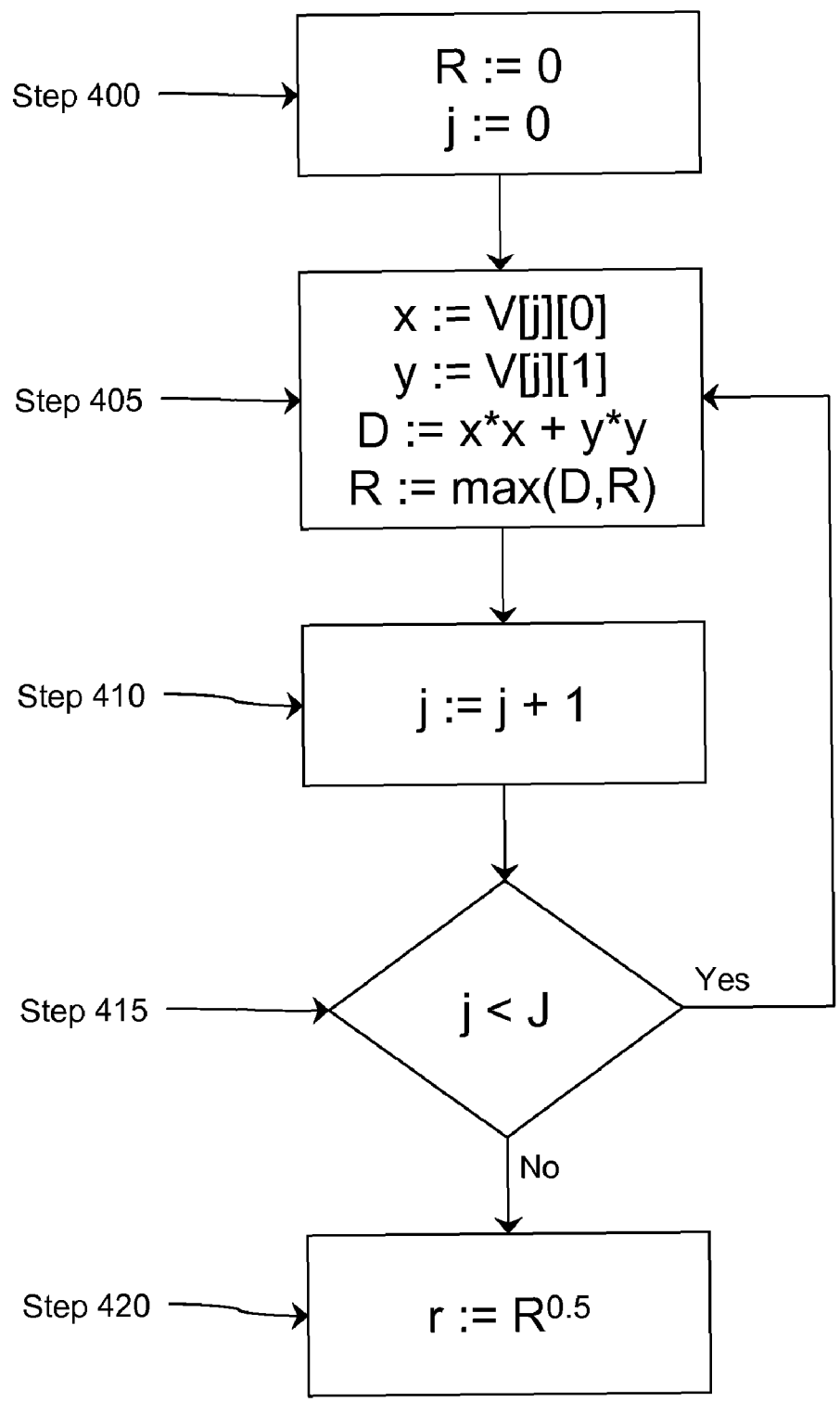
FIG. 4 is a flowchart illustrating an overview of a process to set r according to the presently preferred embodiment.

FIG. 4 is a flowchart illustrating an overview of a process to set r according to the presently preferred embodiment. Typically, the 2D sketch 100 is represented by a set of triangles, where V is the set of vertices of triangles in the sketch, S. V is represented as a J by 2 array, where the j-th vertex has coordinates (V[j−1][0], V[j−1][1]). Referring to FIG. 4, initialize R and j to 0 (Step 400). Next, set x equal to V[j][0], set y equal to V[j][1], set D to (x*x+y*y), and R to the max of (D,R) (Step 405). Increment j by one, according to j=j+1 (Step 410). If j is less than J (Step 415), then return to Step 405, otherwise set r equal to the square root of R (Step 420) that is calculated in FIG. 5, below. Use r to initialize $\phi$ at a maximum theoretical value and then incrementally modify $\phi$ to its real value as discussed in more detail at Step 305, where r is the maximum distance between the point on S and the origin.

Figure 5:
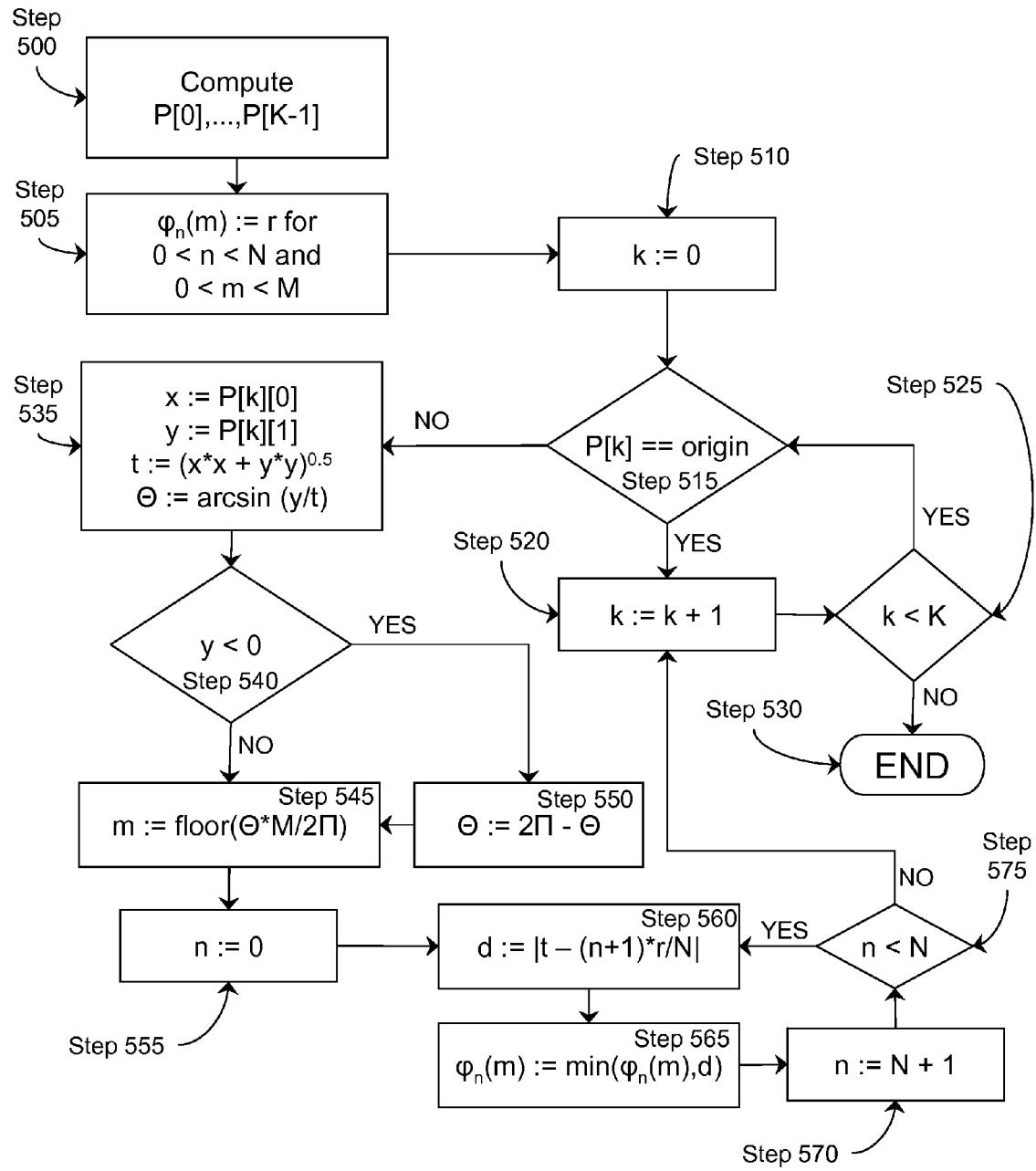
FIG. 5 is a flowchart illustrating an overview of a process to calculate $\phi$ according to the presently preferred embodiment.

FIG. 5 is a flowchart illustrating an overview of a process to calculate $\phi$ according to the presently preferred embodiment. Referring to FIG. 5, M is a power of 2, N and K are positive integers, $\phi$ is a 2-dimensional array of size N by M, P is a 2-dimensional array of size K by 2. It is understood that K should be big enough to obtain a good approximation of the 2D sketch 100, where values of 50,000 or 100,000 is sufficient, but may vary with application or other requirements. Begin by computing P[0] . . . P[K−1] that is a plurality of random points uniformly distributed on the 2D sketch 100 (Step 500), where the k-th point has the coordinates (P[k−1][0], P[k−1][1]). Set $\phi_n(m)$ to r for 0≤n<N and 0≤m<M (Step 505). Initialize k to zero (Step 510). Determine if P[k] is the origin (Step 515), and if it is, then increment k by 1 (Step 520). If k is greater than or equal to K (Step 525), then $\phi_n(m)$ has been constructed (Step 530), and is next used to compute the rotational invariant sketch descriptor (Step 310). If, however, k is less than K, then return to query whether P[k] is the origin. If P[k] is not equal to the origin (Step 515), then set x equal to P[k][0], y equal to P[k][1], t equal to $(x*x+y*y)^{0.5}$, and $\theta$ to the arcsin of (y/t) (Step 535). If y is not less than 0 (Step 540), then set m to the floor of $\theta M/2\pi$ (Step 545). If y is less than 0 (Step 540), then $\theta$ is set to $2\pi-\theta$ (Step 550) and set m to the floor of $\theta M/2\pi$ (Step 545). Continuing from both Steps 545 and 550, set n to 0 (Step 555). Next, set d equal to the absolute value of t−(n+1)*r/N (Step 560). Then set $\phi_n(m)$ to the min of $\phi_n(m)$ and d (Step 565). Increment n by 1 (Step 570). If n is less than N (Step 575), then return to (Step 560), otherwise increment k by 1 (Step 520). From the above steps, the 2D sketch 100 is divided into M sectors of equal size and there are N concentric circles of increasing radius, where it is known that circles can be substituted by other target lines such as a square or polygon. Also, $\phi_n(m)$ is the minimal distance between the intersection of the (m+1)-th sector and the (n+1)-th circle with the set of those points P(k) that lie within the (m+1)-th sector.

Figure 6:
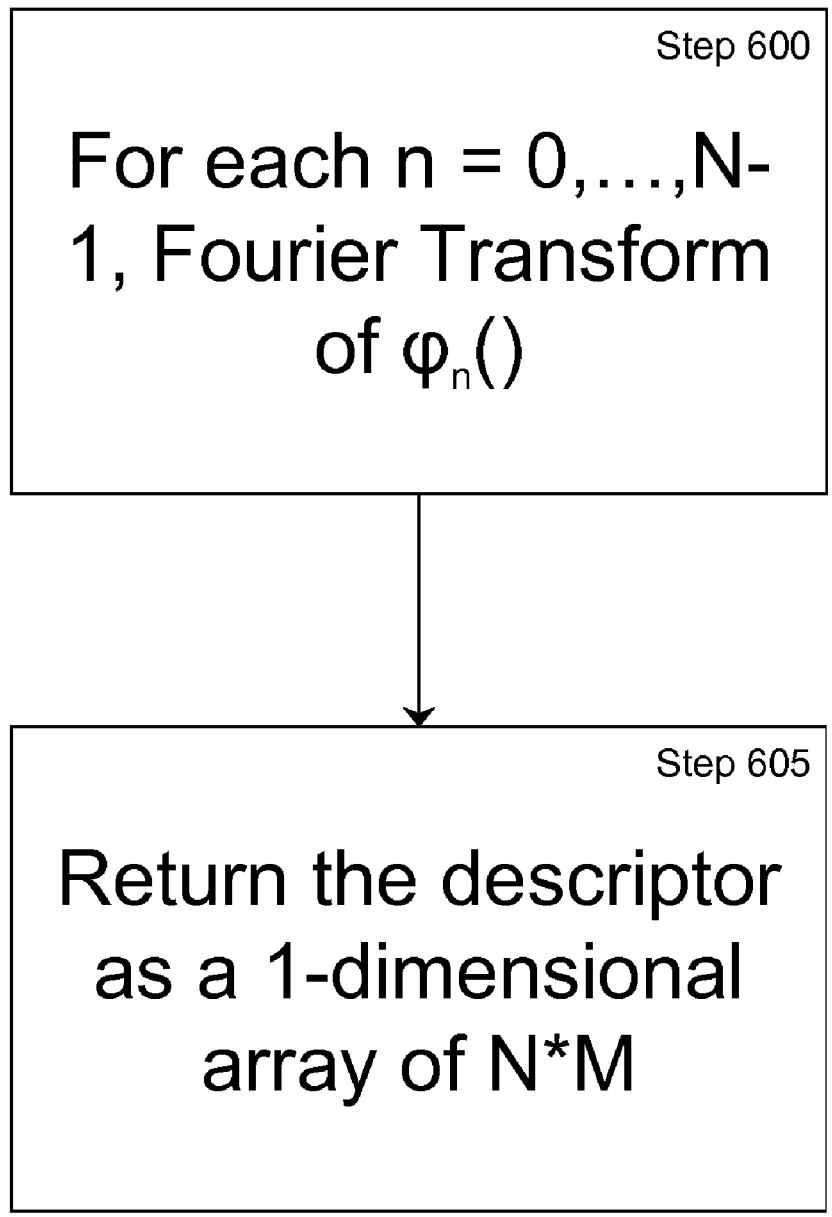
FIG. 6 is a flowchart illustrating an overview of a process to compute a rotational invariant descriptor according to the presently preferred embodiment.

FIG. 6 is a flowchart illustrating an overview of a process to compute the rotational invariant descriptor according to the presently preferred embodiment. Referring to FIG. 6, M is a power of 1, N and K are positive integers, $\phi$ is a 2-dimensional array of size N by M, and $\psi$ is an array of the same size as $\phi$. For each n ∈ {0, . . . ,N−1}, let $\psi_n( )$ equal the Fourier transform of $\phi_n( )$ (Step 600) where the norms of the coefficients are naturally rotation invariant. Return the rotational invariant sketch descriptor as a 1-dimensional array D or dimension N*M such that D[m*M+n] is set to the square of the absolute value of $\psi_n(m)$, for m ∈ {0, . . . ,M−1} and n ∈ {0, . . . ,N−1} (Step 605). Alternatively, the square can be removed. Put another way, a discrete Fourier transform defines the new values $\psi_n(m)$, where m ∈ {0, . . . ,M−1} and n ∈ {0, . . . ,N−1} according to:

$$\psi_n(m) = \sum_{k=0}^{M-1} e^{-2\pi i k/M} \varphi_n(k) \tag{1}$$

so that the rotational invariant descriptor consists of a sequence of:

$$|\psi_0(0)|^2,\ldots,|\psi_0(p)|^2,|\psi_1(0)|^2,\ldots,|\psi_1(p)|^2,\ldots,|\psi_1(p)|^2,\ldots,|\psi_{N-1}(0)|^2,\ldots,|\psi_{N-1}(p)|^2$$

where "p" is an integer and 0<p<M. The higher the value of "p", the thinner the granularity level of detail for the descriptor. Of course it is understood that other Fourier transforms may be implement, preferably Fast Fourier transforms to compute the Fourier coefficients of the discreet functions $\phi_n$. In addition, the norm square (or the norm itself) of the computed Fourier coefficients describe the rotational invariant descriptor, above.

In sum, the presently preferred embodiment constructs a periodic function $\phi$ on each of the concentric circles, that is sampled at M points. Mathematically you can always exactly represent a periodic function using a Fourier series. However a Fourier series is an infinite sum of terms, so the presently preferred embodiment limits the amount of data extracted from the Fourier series representation of $\phi$. Data can be extracted from the Fourier representation using the Fast Fourier transform. Further, $\phi$ is represented by M values so there is no point in extracting more than M values using the Fast Fourier transform. The choice of M is up to the implementer of the algorithm and controls how much information can be stored in the descriptor. Because there are N concentric circles, there are N functions.

EXAMPLE

Figure 7:
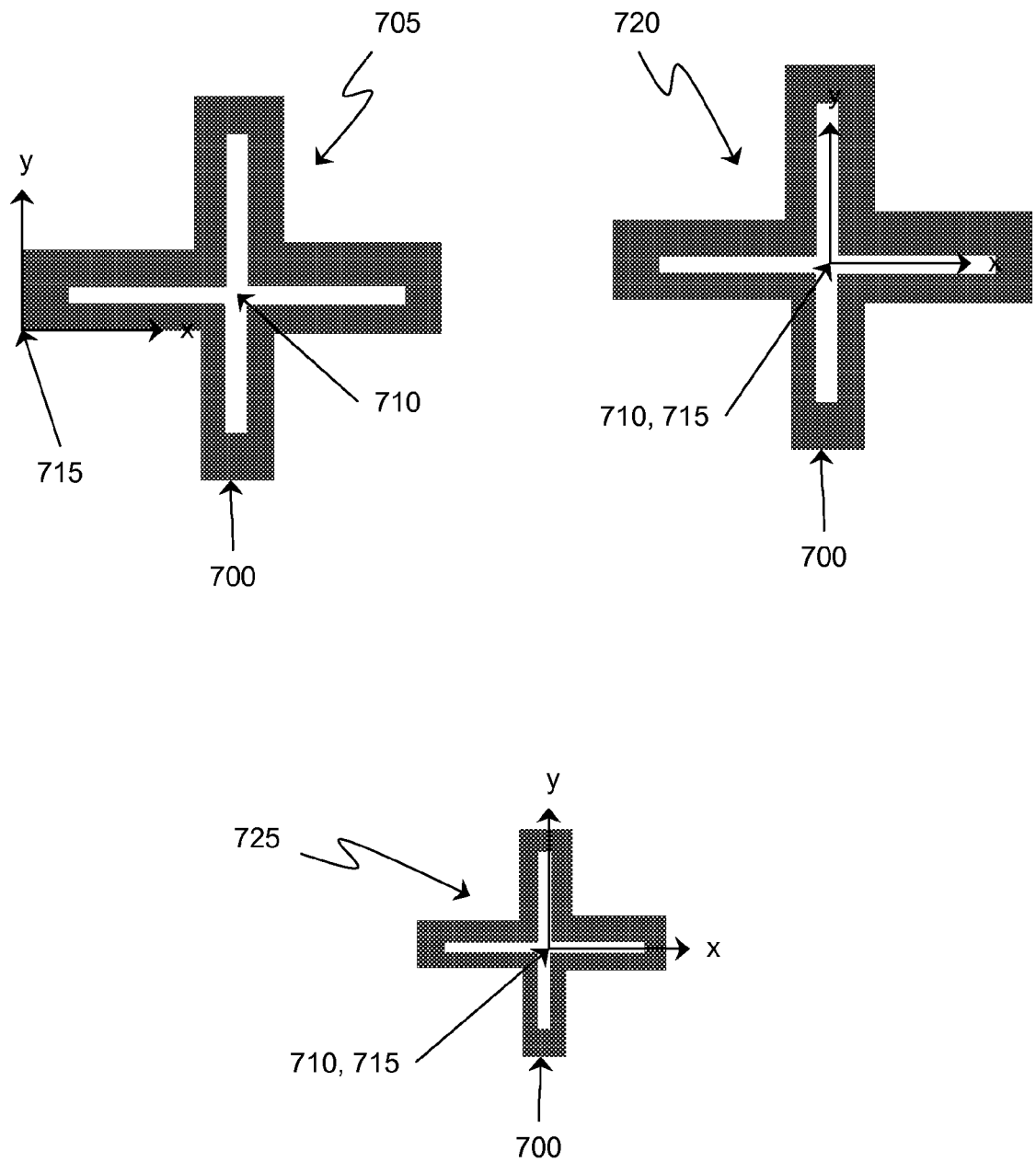
FIG. 7 is an illustration of a 2D sketch.

FIG. 7 is an illustration of a 2D sketch. Referring to FIG. 7, the 2D sketch 100 is that of a hollow cross 700 in an custom orientation illustrated at 705. The hollow cross 700 is translated to achieve translation invariance by locating its center of gravity 710 at an origin of a plane 715, illustrated at 720. Next the hollow cross 700 is scaled to achieve scale invariance according to Step 205, above, illustrated at 725.

Figure 8:
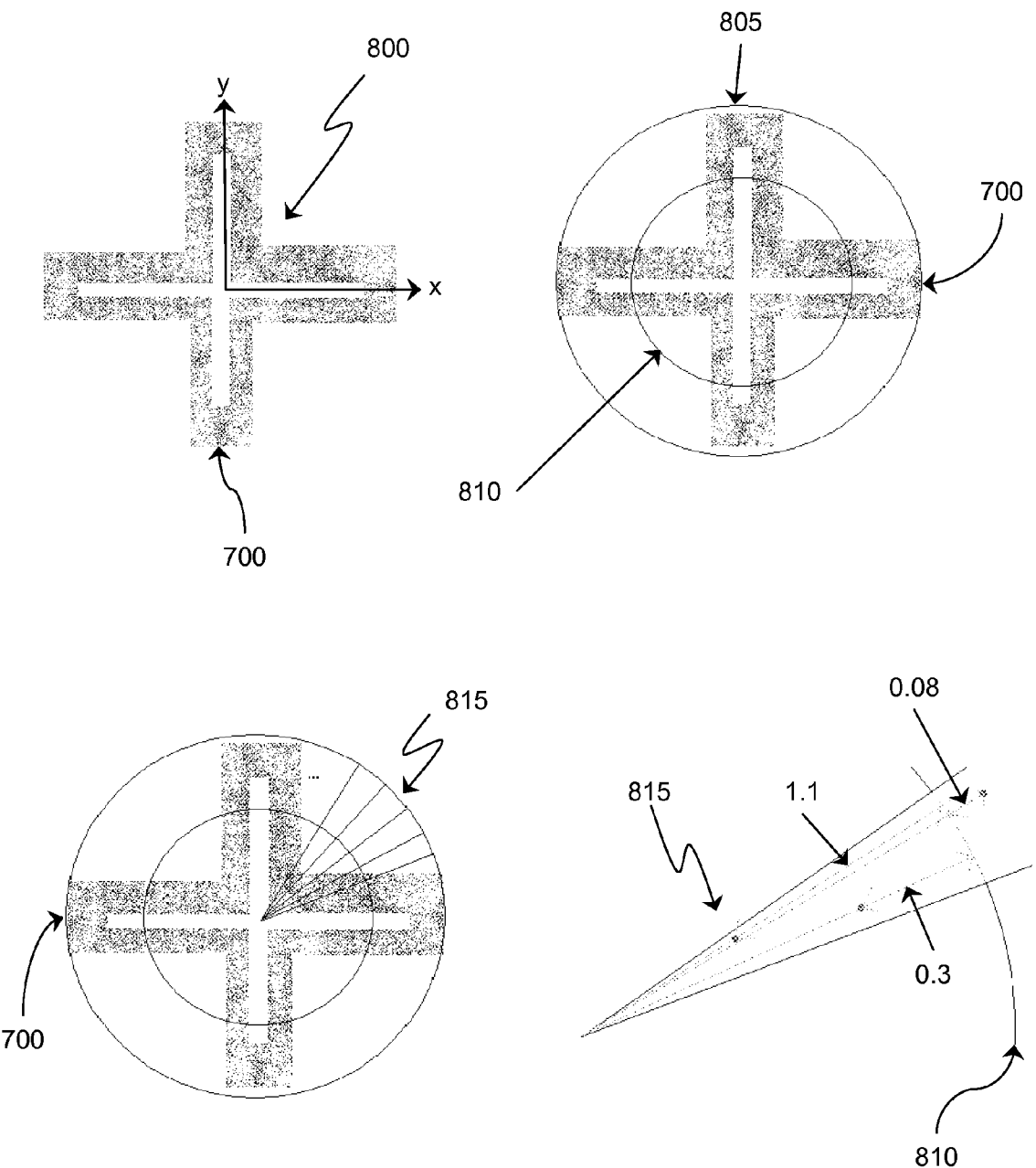
FIG. 8 is an illustration of a 2D sketch prepped for rotationa invariant descriptor computation.
Figure 9:
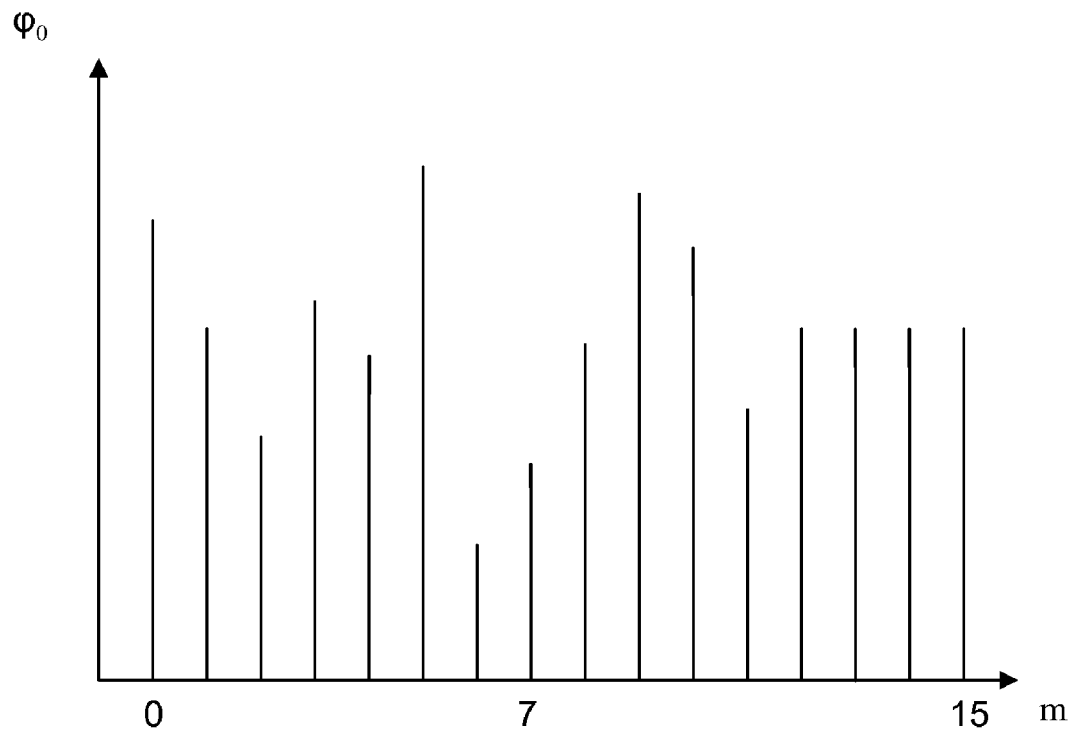
FIG. 9 is a chart of the values for the two discreet functions.
Figure 9:
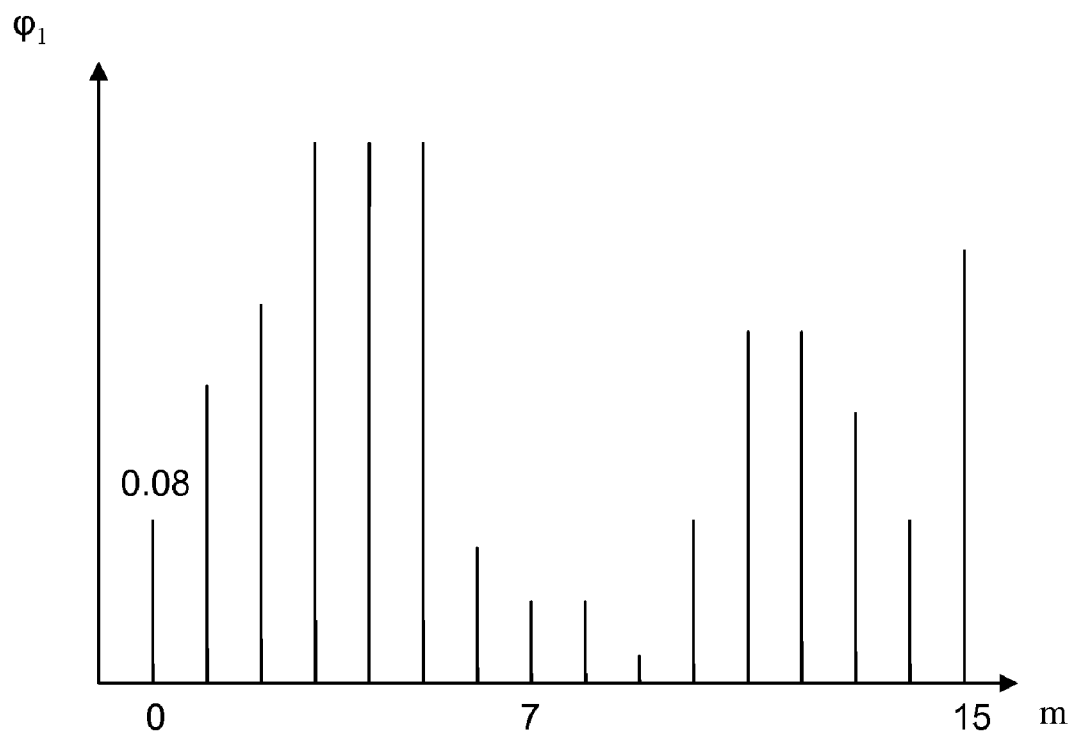

FIG. 8 is an illustration of a 2D sketch prepped for rotational invariant descriptor computation. Referring to FIG. 8, the hollow cross 700 has a large number of random points uniformly distributed thereon, illustrated at 800. Using N=2 circles, a first circle, $\phi_0(m)$, 805 having a radius of 2.7, and a second circle, $\phi_1(m)$, 810 having a radius of 1.35 are determined. The hollow cross 700 is divided into m sectors as illustrated at 815. Then for each sector, the minimal distance between the three points (1.1, 0.3, & 0.08) on the shape and the arcs of the circle contained in that sector is calculated showing 0.08 as the smallest. The $\phi_n(m)$ for this circle (n) and slice (m) is 0.08. FIG. 9 is a chart of the values for the two discreet functions $\phi_n(m)$ of the N=2 circles, for $\phi_0(m)$ and $\phi_1(m)$ where m ∈ {0,1, 2, . . . ,15}.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, for example the use of lines instead of triangles to create m sectors. Further there are some sample alterations that are within the scope and spirit of the presently preferred embodiment, e.g., in Step 505, set $\phi_n(m)$ to max(rn/N, r−(rn/N)). Another example of a modification is to replace Steps 570 and 575 with set n such that nr/N<norm($P_k$)<(n+1)r/N, this way $\phi_n$ depends only on those points that are in between the n-th circle and the (n+1)-th circle. It is also understood that other methods maybe employed to approximate r, such as using the maximum of the norm of P[k]. Therefore, other implementations are within the scope of the following claims.

What is claimed is:

1. A method for determining a descriptor that encodes information about the shape of a two-dimensional sketch, the method performed by a computer and comprising:
   creating a first circle defined by a center of gravity of the sketch and a radius which is the taken to be the maximum distance of any point on the sketch to the center of gravity;
   subdividing the first circle into a plurality of circular sectors;
   creating a plurality of other circles concentric with and smaller than the first circle;
   creating a set of points uniformly distributed over the sketch;
   calculating a minimal distance from each of the plurality of points contained in each of the plurality of circular sectors to the arcs of the plurality of other circles in that circular sector;
   determining a periodic function for each of the plurality of circles defined by the calculated minimal distances to the arcs of the respective circles;
   representing the periodic functions using a Discrete Fourier Transform;
   creating a two-dimensional array of Fourier coefficients corresponding to each of the plurality of functions; and
   storing the two-dimensional array as a rotation-invariant descriptor that uniquely identifies the two-dimensional sketch for efficient retrieval and use in product design and product data management processes.

2. The method of claim 1, further comprising scaling the two-dimensional sketch so that an average distance from each of the set of uniformly-distributed points to the center of gravity is equal to one unit.

3. The method of claim 1, further comprising defining the center of gravity as the origin of the sketch and the origin of a plane on which the sketch is represented.

4. A non-transitory computer readable medium encoded with instructions for determining a descriptor that encodes information about the shape of a two-dimensional sketch that, when executed, cause a data processing system to create a first circle defined by a center of gravity of the sketch and a radius which is the taken to be the maximum distance of any point on the sketch to the center of gravity; subdivide the first circle into a plurality of circular sectors; create a plurality of other circles concentric with and smaller than the first circle; create a set of points uniformly distributed over the sketch; calculate a minimal distance from each of the plurality of points contained in each of the plurality of circular sectors to the arcs of the plurality of other circles in that circular sector; determine a periodic function for each of the plurality of circles defined by the calculated minimal distances to the arcs of the respective circles; represent the periodic functions using a Discrete Fourier Transform; create a two-dimensional array of Fourier coefficients corresponding to each of the plurality of functions; and store the two-dimensional array as a rotation-invariant descriptor that uniquely identifies the two-dimensional sketch for efficient retrieval and use in product design and product data management processes.

5. The computer readable medium of claim 4, further encoded with instructions that, when executed, cause the data processing system to scale the two-dimensional sketch so that an average distance from each of the set of uniformly-distributed points to the center of gravity is equal to one unit.

6. The computer readable medium of claim 4, further encoded with instructions that, when executed, cause the data processing system to define the center of gravity as the origin of the sketch and the origin of a plane on which the sketch is represented.

7. A data processing system configured to determine a descriptor that encodes information about the shape of a two-dimensional sketch, comprising
 a processor; and
 an accessible memory, the data processing system configured to
 create a first circle defined by a center of gravity of the sketch and a radius which is the taken to be the maximum distance of any point on the sketch to the center of gravity;
 subdivide the first circle into a plurality of circular sectors;
 create a plurality of other circles concentric with and smaller than the first circle;
 create a set of points uniformly distributed over the sketch;
 calculate a minimal distance from each of the plurality of points contained in each of the plurality of circular sectors to the arcs of the plurality of other circles in that circular sector;
 determine a periodic function for each of the plurality of circles defined by the calculated minimal distances to the arcs of the respective circles;
 represent the periodic functions using a Discrete Fourier Transform;
 create a two-dimensional array of Fourier coefficients corresponding to each of the plurality of functions; and
 store the two-dimensional array as a rotation-invariant descriptor that uniquely identifies the two-dimensional sketch for efficient retrieval and use in product design and product data management processes.

8. The data processing system of claim 7, further configured to scale the two-dimensional sketch so that an average distance from each of the set of uniformly-distributed points to the center of gravity is equal to one unit.

9. The data processing system of claim 7, further configured to define the center of gravity as the origin of the sketch and the origin of a plane on which the sketch is represented.

10. The data processing system of claim 7, wherein the rotation-invariant descriptor is stored in an indexed descriptor database with a plurality of other rotation-invariant descriptors, each referencing a two-dimensional sketch in a sketch database.

\* \* \* \* \*